US010798154B2

(12) United States Patent
Lovett et al.

(10) Patent No.: US 10,798,154 B2
(45) Date of Patent: Oct. 6, 2020

(54) EXTENDED PARK MODE

(71) Applicant: FORD GLOBAL TECHNOLOGIES, LLC, Dearborn, MI (US)

(72) Inventors: Karin Lovett, Novi, MI (US); Andrew Eugene Burt, Royal Oak, MI (US); James Michael Weinfurther, Farmington, MI (US); Zeljko Deljevic, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 16/036,338

(22) Filed: Jul. 16, 2018

(65) Prior Publication Data

US 2018/0326993 A1 Nov. 15, 2018

Related U.S. Application Data

(62) Division of application No. 14/490,921, filed on Sep. 19, 2014, now Pat. No. 10,035,517.

(51) Int. Cl.
*B60W 10/30* (2006.01)
*H04L 29/08* (2006.01)
(Continued)

(52) U.S. Cl.
CPC .............. *H04L 67/10* (2013.01); *B60W 10/30* (2013.01); *H04L 67/125* (2013.01); *H04W 4/40* (2018.02); *B60R 16/03* (2013.01)

(58) Field of Classification Search
CPC ........ H04W 4/40; H04L 67/10; H04L 67/125; B60R 16/03; B60W 50/08; B60W 1/48; B60W 10/30; B60Q 1/48

(Continued)

(56) References Cited

U.S. PATENT DOCUMENTS 6,073,487 A * 6/2000 Dawson ............. F02M 25/0809
73/114.39
9,446,772 B2 * 9/2016 Lovett ................... B60W 50/10
(Continued)

FOREIGN PATENT DOCUMENTS

| CN | 103863126 A | 6/2014 |
|---|---|---|
| CN | 104112613 A | 10/2014 |
| JP | 2014141216 A | 8/2014 |

OTHER PUBLICATIONS

Governing energy for parked cars; Crepaldi, R.; Welsh, R.; Kravets, R.; Wireless On-demand Network Systems and Services (WONS), 2013 10th Annual Conference on; Year: 2013; pp. 87-94, DOI: 10.1109/WONS.2013.6578325. (Year: 2013).*

(Continued)

*Primary Examiner* — Cuong H Nguyen
(74) *Attorney, Agent, or Firm* — Frank L. Lollo; Brooks Kushman P.C.

(57) ABSTRACT

A vehicle may include a control module and a plurality of vehicle control modules in networked communication with the control module. The control module may be configured to receive an indication from a user interface to transition the vehicle into an extended park mode, and responsive to the indication, instruct the plurality of vehicle control modules to perform operations to reduce their respective key-off loads on the vehicle. A cloud service may be configured to receive, over a wide-area network responsive to user input to a mobile device, an indication to transition a vehicle associated with the mobile device into an extended park mode, and responsive to the indication, provide a message over the network to the vehicle to instruct the vehicle to perform operations to reduce key-off loads of a plurality of vehicle control modules of the vehicle.

18 Claims, 7 Drawing Sheets

(51) Int. Cl.
*H04W 4/40* (2018.01)
*B60R 16/03* (2006.01)

(58) Field of Classification Search
USPC ........................................ 701/2, 36; 709/201
See application file for complete search history.

(56) References Cited

U.S. PATENT DOCUMENTS

| | | | | |
|---|---|---|---|---|
| 9,452,732 | B1* | 9/2016 | Hermann | B60R 25/40 |
| 9,513,133 | B2* | 12/2016 | Semsey | H04W 84/12 |
| 10,093,197 | B2* | 10/2018 | Deljevic | B60R 16/03 |
| 10,363,796 | B2* | 7/2019 | DeCia | B60R 16/03 |
| 10,378,919 | B2* | 8/2019 | DeCia | G01C 21/3667 |
| 10,608,447 | B2* | 3/2020 | Varughese | B60R 16/03 |
| 2012/0188101 | A1 | 7/2012 | Ganot | |
| 2013/0110296 | A1* | 5/2013 | Khoo | G06F 1/26 |
| | | | | 700/286 |
| 2013/0138714 | A1* | 5/2013 | Ricci | G06F 3/017 |
| | | | | 709/201 |
| 2013/0293394 | A1* | 11/2013 | Rubin | G08G 9/02 |
| | | | | 340/902 |
| 2015/0061550 | A1* | 3/2015 | Schulz | H02P 3/14 |
| | | | | 318/376 |
| 2015/0161834 | A1* | 6/2015 | Spahl | G07C 9/00111 |
| | | | | 340/5.61 |
| 2015/0319558 | A1* | 11/2015 | Smereka | H04L 67/10 |
| | | | | 455/41.2 |
| 2019/0212997 | A1* | 7/2019 | Sangameswaran | G06F 8/65 |
| 2019/0217720 | A1* | 7/2019 | Treharne | B60L 58/22 |

OTHER PUBLICATIONS

The value of reserve for plug-in electric vehicle parking lots; Nilufar Neyestani; Joao P. S. Catalao; 2017 IEEE Manchester PowerTech; Year: 2017; pp. 1-6. (Year: 2017).*

Optimal Charging/Discharging Control for Electric Vehicles Considering Power System Constraints and Operation Costs Rong-Ceng Leou; IEEE Transactions on Power Systems; Year: 2016, vol. 31, Issue: 3; pp. 1854-1860. (Year: 2016).*

Smart intelligent electric vehicle (Enhanching flexibility); 2017 International Conference on Electrical, Computer and Communication Engineering (ECCE); Year: 2017; pp. 33-37. (Year: 2017).*

* cited by examiner

EXTENDED PARK MODE

CROSS-REFERENCE TO RELATED APPLICATIONS

This application is a division of U.S. application Ser. No. 14/490,921 filed Sep. 19, 2014, now U.S. Pat. No. 10,035,517 issued Jul. 31, 2018, the disclosure of which is hereby incorporated in its entirety by reference herein.

TECHNICAL FIELD

Aspects of the disclosure generally relate to an extended park mode for a vehicle, in which battery key-off load is reduced.

BACKGROUND

Vehicle key-off load may be defined as a current drain on a battery of a vehicle when the ignition key is in the off position. In some cases, when a vehicle is parked for an extended period of time, key-off load may cause a significant reduction in the state of charge of the vehicle battery. Some drivers limit key-off load by electrically disconnecting the battery when leaving the vehicle parked for an extended time. However, for some vehicles the battery may be difficult to access, and in any event such approaches are inconvenient for the driver.

SUMMARY

In a first illustrative embodiment, a system a plurality of vehicle control modules in networked communication, wherein one of the control module is configured to receive an indication from a user interface to transition the vehicle into an extended park mode, and responsive to the indication, instruct the plurality of vehicle control modules to perform operations to reduce their respective key-off loads on the vehicle.

In a second illustrative embodiment, a system includes a cloud service configured to receive, over a wide-area network responsive to user input to a mobile device, an indication to transition a vehicle associated with the mobile device into an extended park mode, and responsive to the indication, provide a message over the network to the vehicle to instruct operations to reduce key-off loads of a plurality of vehicle control modules.

In a third illustrative embodiment, a system includes a module of a vehicle connected to a vehicle bus and configured to perform at least one vehicle function under the power of a battery of the vehicle; receive a message over the vehicle bus requesting the module to transition into extended park mode; and perform operations to reduce key-off load of the module on the battery responsive to the message.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle may implement a setting configured to allow a user to transition a vehicle into an extended park mode in which key-off load is minimized. To allow the vehicle to enter the extended park mode, a control module of the vehicle may be configured to issue a command to other modules of the vehicle to cause those modules to transition to a reduced power mode. This will accordingly reduce the load on the battery during anticipated extended vehicle stand times. In an example, the driver may command the vehicle to enter the extended park mode through a menu selection on a vehicle graphic user interface (GUI). In another example, the driver may remotely command the vehicle to enter the extended park mode using a phone or other mobile device.

When the vehicle is in the extended park mode, the vehicle modules may be configured to perform operations to reduce their respective key-off loads on the vehicle. These operations may include, for example, (i) for modules that perform periodic polling of input, to slow down or stop their polling, (ii) to disable periodic clock accuracy adjustments to allow the human-readable clock to drift, (iii) to turn off tire pressure monitoring system (TPMS) monitoring, (iv) to turn off door sensors for passive entry features (e.g., excluding the driver door), (v) to limit embedded modem functionality and telecommunication updates, such as to allow unlock, remote start and disable extended park mode, (vi) to disable approach detection features, (vii) to disable fuel operated heater systems, (viii) to disable extended play mode, (ix) to disable illuminated entry/exit lighting, (x) to limit or eliminate battery saver duration control length of interior lighting, (xi) to disable powertrain wake on door ajar, (xii) to disable wake on oil minder, and (xiii) to disable global positioning system (GPS) updates. For hybrid or pure electric vehicles, these operations may also include, for example, (i) to discontinue cabin preconditioning, (ii) to discontinue battery drive conditioning, and to (iii) disable scheduled-charge-not-occurring signals.

To allow the vehicle to exit the extended park mode, the control module of the vehicle may be configured to issue a command to other modules of the vehicle to cause the modules to transition back to the normal power mode. In an example, the vehicle may automatically transition from the extended park mode to the normal mode on the next key start. As another possibility, the vehicle may transition back to the normal mode based on the key start and selection to turn off extended park mode by way of a prompt to the driver via the vehicle user interface (e.g., cluster, center stack, etc.). As some other possibilities, the driver may command the vehicle to exit the extended park mode through a menu selection on the vehicle GUI or by way of a menu selection from a radio frequency connected device or telecommunication device.

Figure 1:
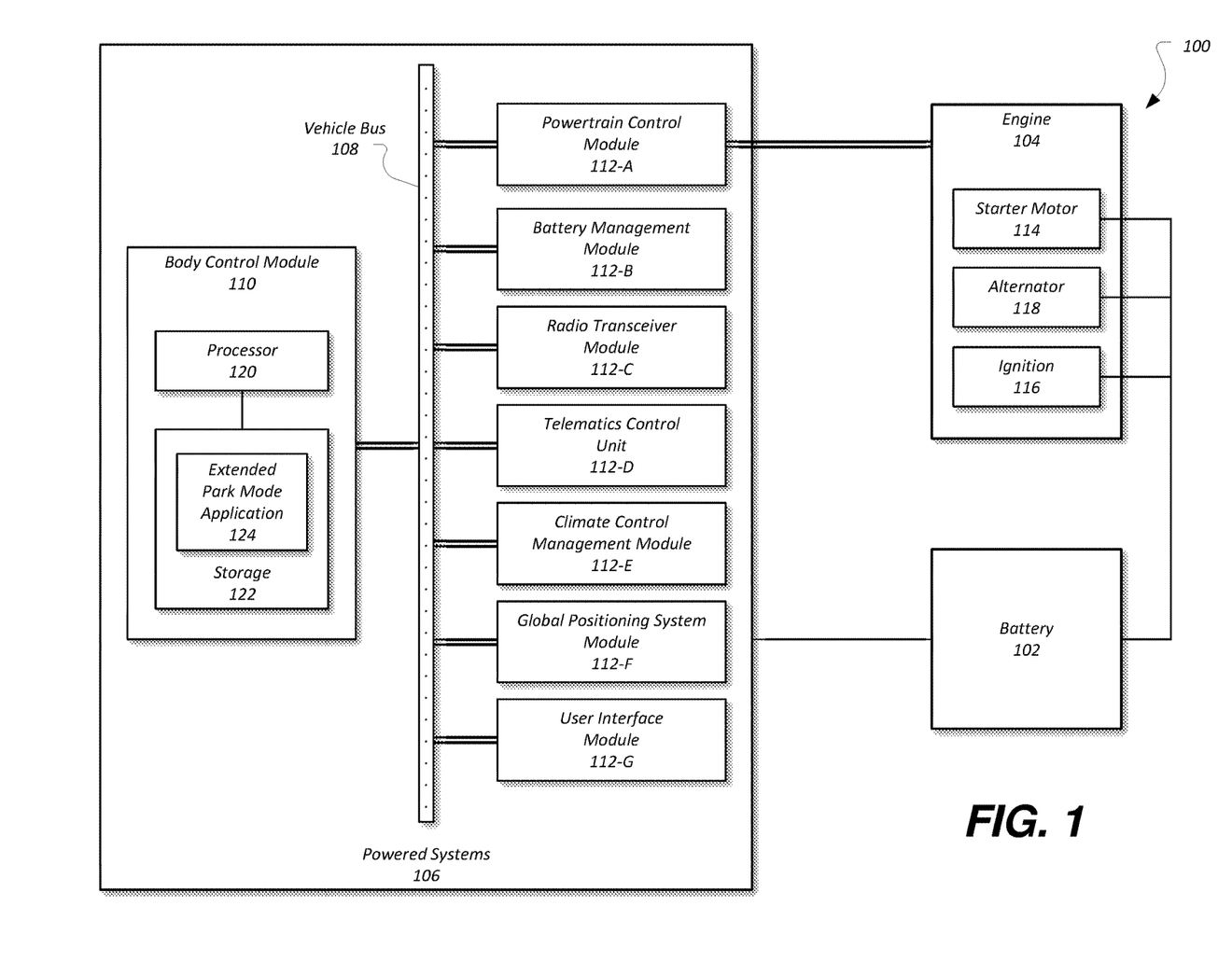
FIG. 1 illustrates an example vehicle implementing an extended park mode.

FIG. 1 illustrates an example vehicle 100 implementing an extended park mode. As illustrated, the vehicle 100 includes a battery 102, an engine 104, powered systems 106 and one or more vehicle buses 108. The powered systems 106 include a body control module 110 and plurality of system modules 112. The modules 110, 112 are in communication over the bus 108 and configured to perform various vehicle functions under the power of the vehicle battery 102.

The battery 102 may include various types of rechargeable battery configured to supply electric energy to various components of the vehicle 100. In an example, the battery 102 may be a 12 Volt lead-acid battery. The battery 102 may be configured to power the starter motor 114 and the ignition system 116 of the engine 104 when the engine 104 is not running, and may receive electric charge from the alternator 118 when the engine 104 is running. In another example, the battery 102 may include a traction battery or battery pack configured to store energy that can be used by one or more electric machines of the vehicle 100 that can provide propulsion and deceleration capability, whether the engine 104 is turned on or off.

The body control module 110 may be configured to support various functions of the vehicle 100 related to control of current loads feeding off the battery 102. Examples of such current loads include, but are not limited to, exterior lighting, interior lighting, heated seats, heated windshield, heated backlight, and heated mirrors. Additionally, the body control module 110 may be configured to manage vehicle 100 access functions, such as keyless entry, remote start, and point of access status verification (e.g., closure status of the hood, doors and/or trunk of the vehicle 100).

The vehicle bus 108 may include various method of communication available between the system modules 112, as well as between the body control module 110 and the system modules 112. As some non-limiting examples, the vehicle bus 108 may include a controller area network (CAN) bus and/or an Ethernet network.

The body control module 110 may include various types of computing apparatus to facilitate the performance of the functions of the body control module 110. In an example, the body control module 110 may include a processor 120 configured to execute computer instructions, and a storage medium 122 on which the computer-executable instructions may be maintained. A computer-readable storage medium 122 (also referred to as a processor-readable medium 122 or storage 122) includes any non-transitory (e. g., tangible) medium that participates in providing data (e.g., instructions) that may be read by a computer (e.g., by the processor 120). In general, a processor 120 receives instructions, e.g., from the storage 122, etc., and executes these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Fortran, Pascal, Visual Basic, Java Script, Perl, PL/SQL, etc.

The plurality of system modules 112 may be configured to perform various vehicle functions under the power of the vehicle battery 102. As depicted, the modules 112 are represented as discrete modules 112. However, the modules 112 may share physical hardware, firmware, and/or software, such that the functionality from multiple modules 112 may be integrated into a single module 112, and that the functionality of various such modules 112 may be distributed across a plurality of modules 112.

As some non-limiting module 112 examples, a powertrain control module 112-A may be configured to provide control of engine 104 operating components (e.g., idle control components, fuel delivery components, emissions control components, etc.) and for monitoring status of such engine operating components (e.g., status of engine fault codes); a battery management module 112-B may be configured to compute and provide state of charge status (e.g., to the powertrain control module 112-A or others); a radio transceiver module 112-C may be configured to send and receive messages by way of a wireless network or paired communications device; a telematics control unit 112-D may be configured to send and receive commands from the paired communications device or wireless network connection using the facilities of the radio transceiver module 112-C (e.g., to provide low battery alerts to a driver's phone or to a web database); a climate control management module 112-E may be configured to provide control of heating and cooling system components (e.g., compressor clutch, blower fan, temperature sensors, etc.); a global positioning system (GPS) module 112-F may be configured to provide vehicle location information; and a user interface module 112-G may be configured to provide vehicle status information to a driver, such as fuel level info, engine operating temperature information, and current location of the vehicle 100.

The system modules 112 may be configured to perform certain vehicle functions when the engine 104 is running. In other cases, the system modules 112 may be configured to perform at least a subset of their functions even when the vehicle is parked and the vehicle engine 104 is not running (sometimes referred to herein as keyed-off). As some non-limiting examples of module 110, 112 functionality that may be performed when the vehicle is keyed off, the body control module 110 may perform periodic polling for keyless entry, passive entry, or other access management features, the battery management module 112-B may perform battery drive conditioning and warn regarding scheduled charges that are not occurring, the radio transceiver module 112-C may receive commands such as unlock or remote start, the climate control management module 112-E may perform cabin preconditioning in anticipation of an expected trip by the driver at a time prescheduled with the vehicle 100, and the GPS module 112-F may provide location updates for the vehicle 100.

Vehicle functions performed by the body control module 110 and system modules 112 when the vehicle is keyed off produce a current drain on the battery 102 of the vehicle 100. In some cases, when the vehicle 100 is parked for an extended period of time, the key-off loads may cause a significant reduction in the state of charge of the battery 102.

To address these key-off loads, the vehicle 100 may utilize the extended park mode application 124 to implement an extended park mode in which key-off load is minimized. The extended park mode application 124 may be one application included on the storage 122 of the body control module 110.

The extended park mode application 124 may include instructions that, when executed by the body control module 110, cause the body control module 110, in response to receiving an indication from a user interface requesting to transition the vehicle 100 into an extended park mode, to issue a command to the other modules 112 of the vehicle 100 to cause those modules 112 to transition to a reduced power mode (i.e., to perform operations to reduce their respective key-off loads on the vehicle 100). Accordingly, based on user direction the vehicle 100 may be configured to reduce the load on the battery 102 during anticipated extended vehicle stand times. The extended park mode application 124 may further include instructions configured to cause the body control module 110 to receive an indication from the user interface to transition the vehicle 100 out of the extended park mode, and provide a second message to the modules 112 to cause the modules to return to normal operation. Further aspects of the operation of the extended park mode application 124 are discussed in detail below.

When the vehicle is in the extended park mode, the modules 110, 112 may be configured to perform operations to reduce their respective key-off loads on the vehicle 100. These operations may include, for example, (i) for modules 110, 112 that perform periodic polling of input, to slow down or stop their polling, (ii) to disable periodic clock accuracy adjustments to allow the human-readable clock to drift, (iii) to turn off tire pressure monitoring system (TPMS) monitoring, (iv) to turn off door sensors for passive entry features (e.g., excluding the driver door), (v) to limit embedded modem functionality and telecommunication updates, such as only to allow unlock, remote start and disable extended park mode, (vi) to disable approach detection features, (vii) to disable fuel operated heater systems, (viii) to disable extended play mode, (ix) to disable illuminated entry/exit lighting, (x) to limit or eliminate battery saver duration control length of interior lighting, (xi) to disable powertrain wake on door ajar, (xii) to disable wake on oil minder, and (xiii) to disable global positioning system (GPS) updates. For hybrid or pure electric vehicles, these operations may also include, for example, (i) to discontinue cabin preconditioning, (ii) to discontinue battery drive conditioning, and to (iii) disable scheduled-charge-not-occurring signals.

Figure 2:
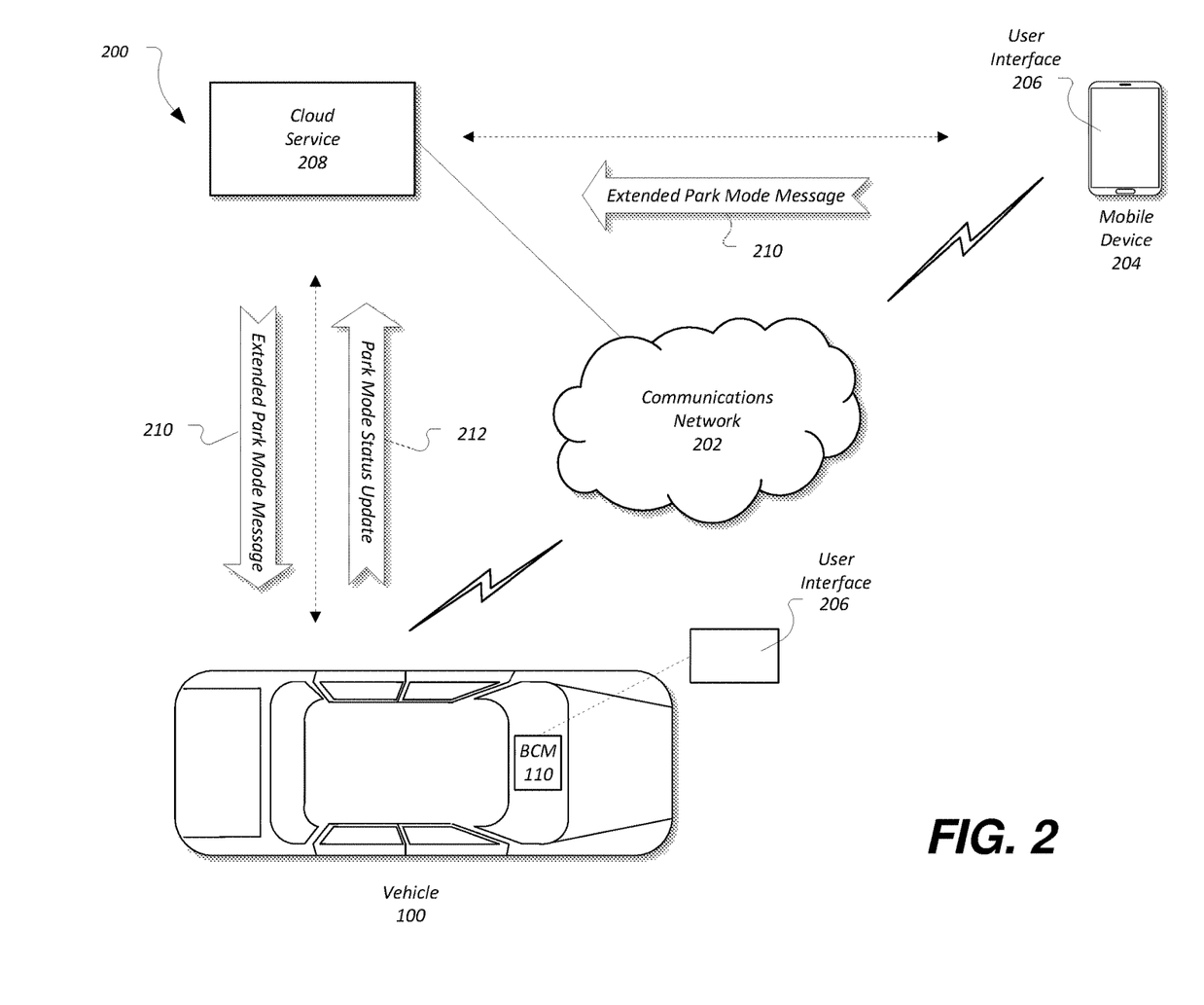
FIG. 2 illustrates an example system including a cloud service in communication with a mobile device and the vehicle implementing extended park mode.

FIG. 2 illustrates an example system 200 including a cloud service 208 in communication with a mobile device 204 and the vehicle 100 implementing extended park mode. The communications network 202 may include one or more interconnected communication networks configured to provide communications services, such as Internet access, voice or data over IP communications, short messaging service (SMS) and/or multimedia messaging service (MMS) communications, and location services, to at least one connected device. As some examples, the communications network 202 may include the Internet, a satellite link network, a wireless wide area network, and a cellular telephone network, as some non-limiting possibilities.

The mobile devices 204 may include various computing devices configured to communicate over the communications network 202 as well as to move in location with respect to the physical structure of the communications network 202. Exemplary mobile devices 204 may include laptop computers, mobile telephones and smartphones, GPS devices, tablet computers, and the vehicles 100 themselves for vehicles that include built-in modems.

The mobile devices 204 may be configured to provide a user interface 206 from which the user may be able to configure the extended park mode setting of the vehicle 100. As one possibility, the mobile device 204 may log into the cloud service 208, such as via a web browser of the mobile device 204 connected to a web interface of the cloud service 208 or by way of a client application of the mobile device 204 configured to communicate with the cloud service 208.

Additionally or alternately, the extended park mode application 124 of the vehicle 100 may be configured to provide a user interface 206 within the vehicle 100 from which the user may be able to configure the extended park mode setting, e.g., using the services of the user interface module 112-G of the vehicle 100.

When the user makes a selection from the user interface 206 of the vehicle 100, the extended park mode application 124 may be configured to receive the user input and adjust the extended park mode setting appropriately. When the user makes a selection from the user interface 206 provided by the mobile devices 204, the mobile devices 204 may be configured to generate and send an extended park mode message 210 to the cloud service 208 over the communications network 202. The extended park mode message 210 may include information indicating whether or not the user wishes to place the vehicle in extended park mode. The extended park mode messages 210 may also include, for example, an identifier of the mobile device 204 making the request, an identifier of an account of a user of the mobile device 204 making the request (e.g., phone number, e-mail address, etc.), and/or an identifier of the vehicle 100 whose extended park mode setting is to be updated (e.g., vehicle identification number (VIN) or some other unique vehicle 100 identifier). As another example, the cloud service 208 may identify the vehicle 100 based on the information of the login session of the mobile device 204 with the cloud service 208 (e.g., web session information, client application session state, etc.). Further detail and examples with respect to the user interface 206 are discussed in detail below with respect to FIGS. 3-7.

The cloud service 208 may be configured to receive extended park mode messages 210 over the communications network 202 from the mobile device 204, determine to which vehicle 100 the extended park mode messages 210 should be directed, and forward the extended park mode messages 210 to the appropriate vehicle 100.

When the vehicles 100 transition into and out of extended park mode, the vehicles 100 may be configured to provide park mode status update messages 212 to the cloud service 208. The park mode status update messages 212 may include information such as the current extended park mode status of the vehicle 100, an identifier of an account of a user associated with the vehicle 100 (e.g., phone number, e-mail address, etc.), and/or an identifier of the vehicle 100 whose extended park mode setting is updated (e.g., vehicle identification number (VIN) or some other unique vehicle 100 identifier). These park mode status update messages 212 may accordingly allow the cloud service 208 to track which vehicles 100 are in extended park mode, and which vehicles are not.

Using the park mode status information regarding the vehicles 100, the cloud service 208 may be configured to filter out the sending of various messages by the cloud service 208. In an example, if the vehicle 100 is indicated as being in the extended park mode, then the cloud service 208 may elect to defer the sending of software update requests to the vehicle 100.

Figure 3:
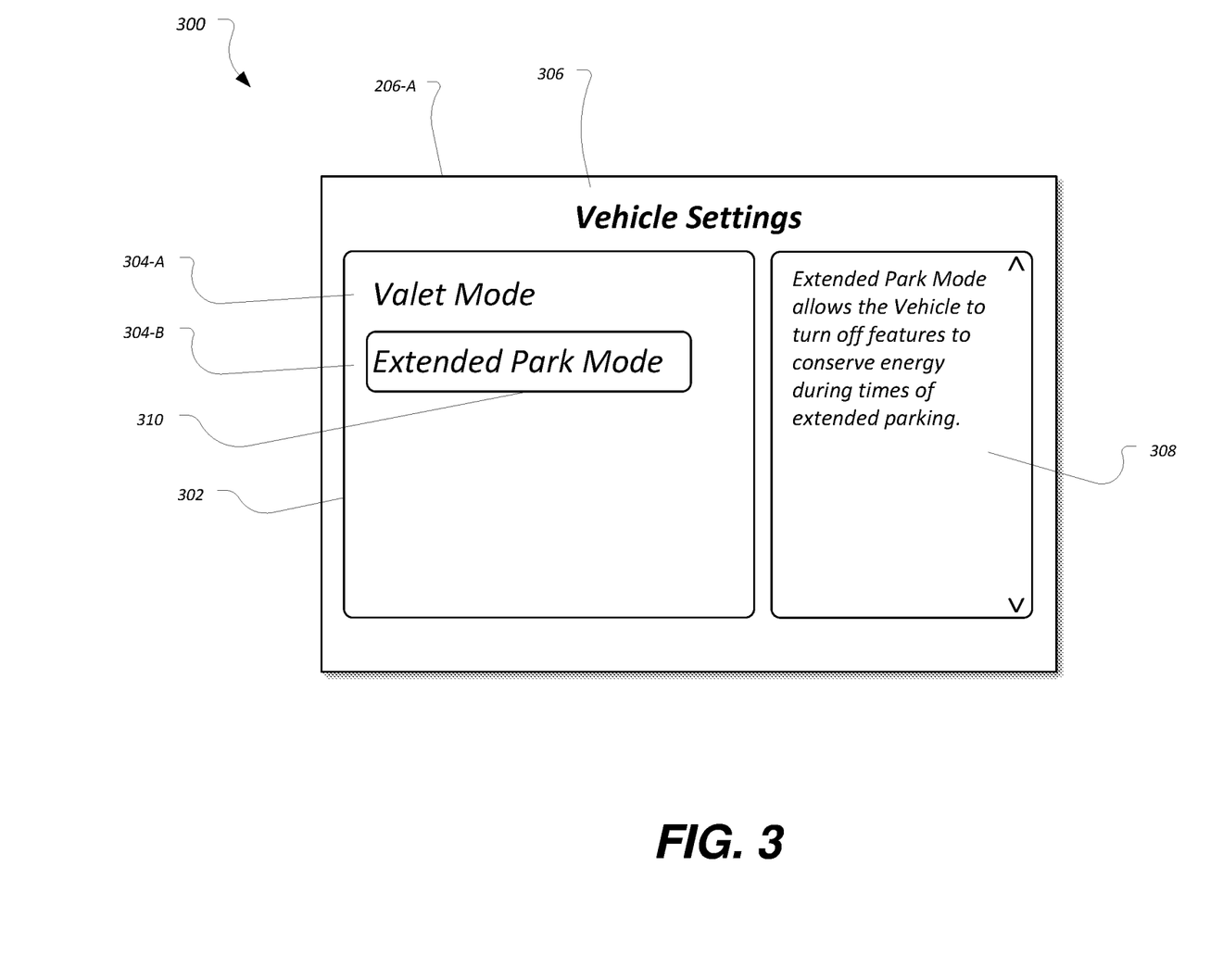
FIG. 3 illustrates an example vehicle user interface for selection of extended park mode.

FIG. 3 illustrates a diagram 300 of an example vehicle user interface 206-A for selection of extended park mode. In an example, the user interface 206-A may be presented to the user via display features of the user interface module 112-G, e.g., upon selection of a vehicle settings configuration option by the user. The user interface 206-A may include a list control 302 configured to display a listing of the vehicle settings that may be configured by the user as selectable list entries 304. The user interface 206-A may also include a title label 306 to indicate to the user that the user interface 206-A is for selection of vehicle settings, and a help information control 308 configured to provide information regarding the currently selected list entry 310.

As illustrated, the list control 302 of the connected application includes an entry 304-A for a valet mode setting and an entry 304-B for the extended park mode setting. It should be noted that the exact commands, number of commands, and command order is merely an example. The list control 302 may operate as a menu, such that a user of the user interface 206-A may be able to scroll through list entries of the list control 302 (e.g., using up and down arrow buttons and a select button to invoke the selected list entry 310). In some cases, the list control 302 may be displayed on a touch screen display, such that the user may be able to touch the list control 302 to select and invoke a menu item. As another example, the user interface 206-A may support voice command selection of the menu items. For example, to invoke the extended park mode command, the user may press a push-to-talk button within the vehicle 100, and may speak the voice command "extended park mode."

Figure 4:
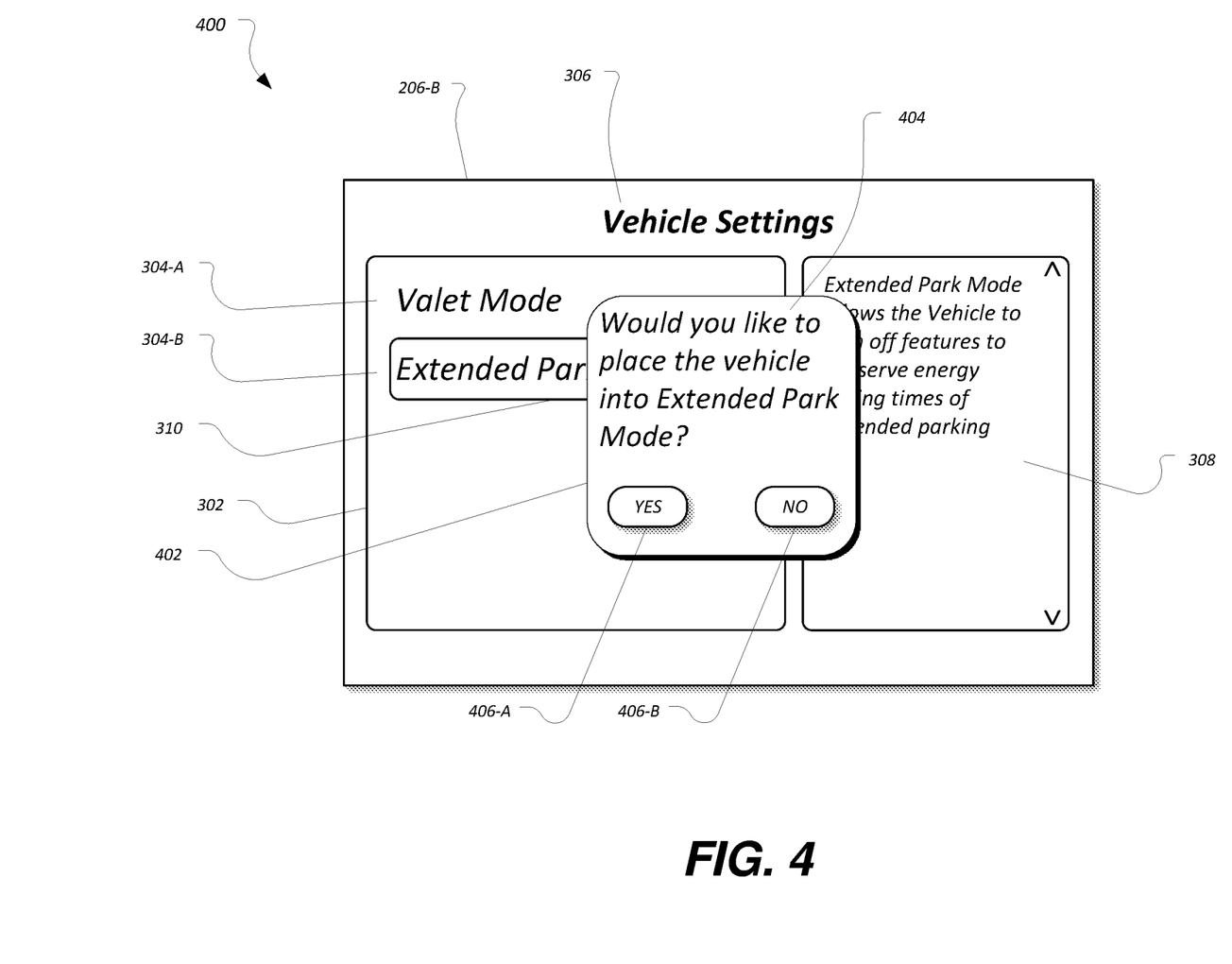
FIG. 4 illustrates an example vehicle user interface for confirmation of selection of extended park mode.

FIG. 4 illustrates a diagram 400 of an example vehicle user interface 206-B for confirmation of selection of extended park mode. As with the user interface 206-A, the user interface 206-B may be presented to the user via display features of the user interface module 112-G. The user interface 206-B may be displayed, for example, based upon a user selection of the extended park mode entry 304-B of the user interface 206-A. The user interface 206-B may include a confirmation control 402 displaying a prompt control 404 including information indicative of a settings change to be confirmed, and option controls 406 configured to receive the user confirmation or rejection of the setting change.

As illustrated, the prompt control 404 includes information requesting the user to confirm transitioning the vehicle into extended park mode. If the user selects the yes option control 406-A, then the vehicle 100 may transition into extended park mode. However, if the user selects the no option control 406-B (or takes no action for a timeout period as another possibility), then the vehicle 100 may not transition into extended park mode.

Figure 5:
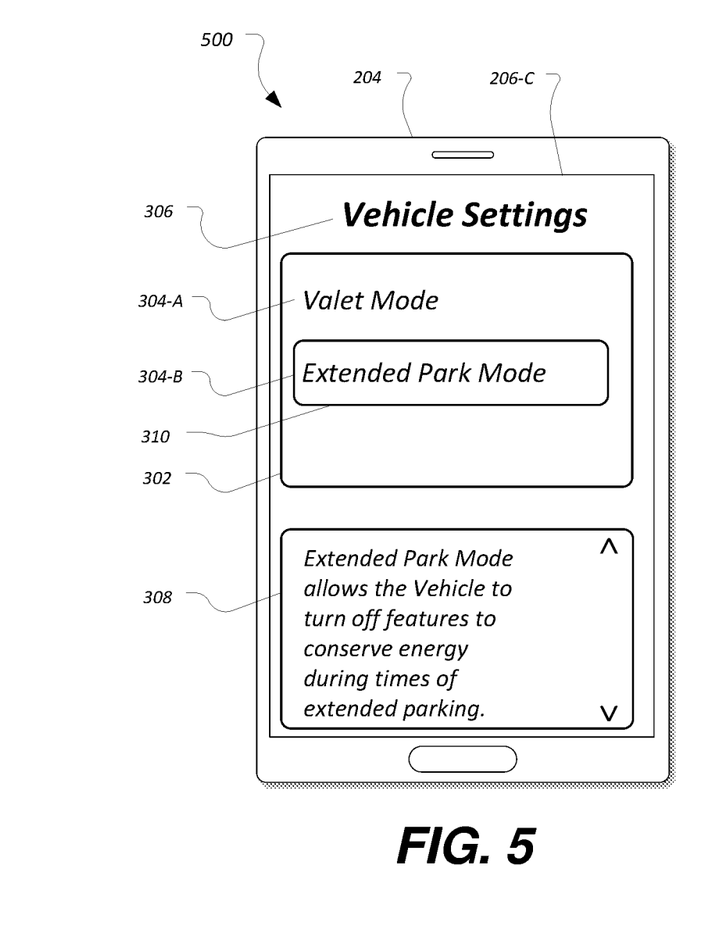
FIG. 5 illustrates an example mobile user interface for selection of extended park mode.

FIG. 5 illustrates a diagram 500 of an example mobile user interface 206-C for selection of extended park mode. In an example, the user interface 206-C may be presented to the user via display features of the mobile device 204. Content and user operation of the user interface 206-C may be similar to that of the user interface 206-A discussed in detail above.

Figure 6:
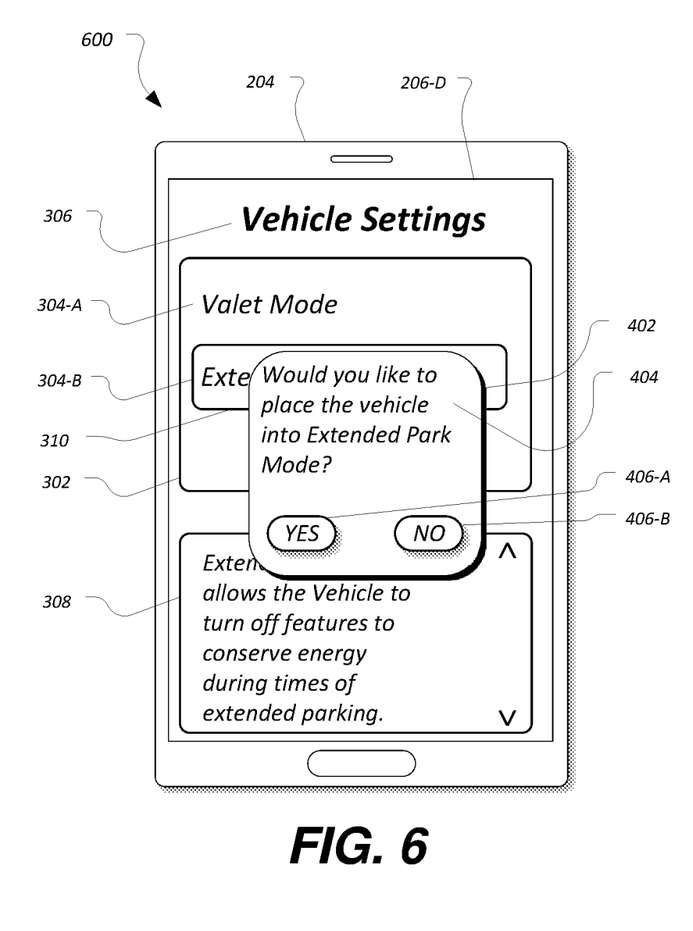
FIG. 6 illustrates an example mobile user interface for confirmation of selection of extended park mode.

FIG. 6 illustrates a diagram 600 of an example mobile user interface 206-D for confirmation of selection of extended park mode. In an example, the user interface 206-D may be presented to the user via display features of the mobile device 204. Content and user operation of the user interface 206-D may be similar to that of the user interface 206-B discussed in detail above.

Figure 7:
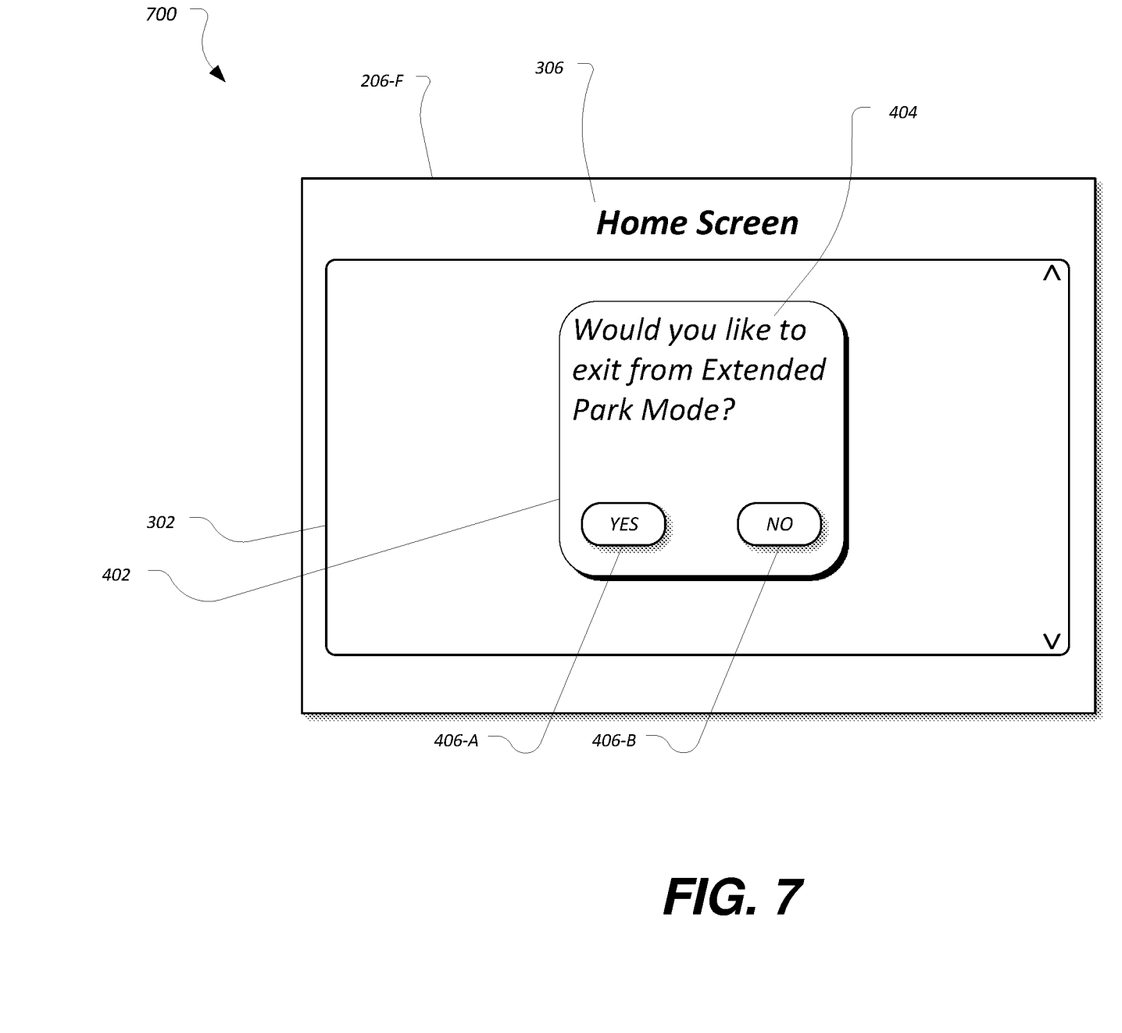
FIG. 7 illustrates an example vehicle user interface for confirmation of removal of the vehicle from extended park mode.

FIG. 7 illustrates a diagram 700 of an example vehicle user interface 206-E for confirmation of removal of the vehicle 100 from extended park mode. As with the user interfaces 206-A and 206-B, the user interface 206-E may be presented to the user via display features of the user interface module 112-G. In another example (not shown), the user interface 206-E may be presented by the mobile device 204.

The user interface 206-E may include a confirmation control 402 displaying a prompt control 404 including information indicative of a settings change to be confirmed, and option controls 406 configured to receive the user confirmation or rejection of the setting change. The confirmation control 402 of the user interface 206-E may be displayed, for example, by the vehicle 100 based on the extended park mode application 124 receiving notification of a key-on of the vehicle 100 when the vehicle 100 is in the extended park mode.

As illustrated, the prompt control 404 includes information requesting the user to confirm transitioning the vehicle out of extended park mode. If the user selects the yes option control 406-A, then the vehicle 100 may transition from extended park mode back to normal mode. However, if the user selects the no option control 406-B (or takes no action for a timeout period as another possibility), then the vehicle 100 may not transition out of extended park mode.

Figure 8:
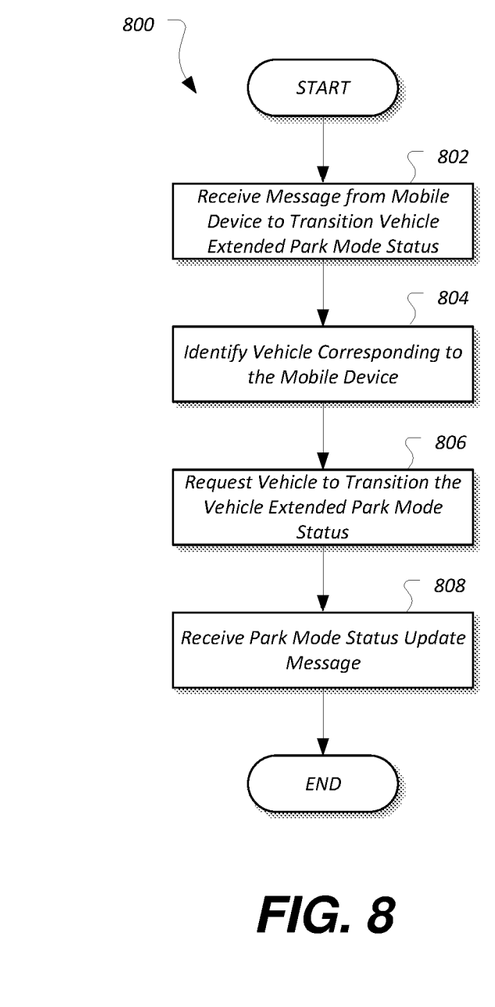
FIG. 8 illustrates an example process for requesting extended park mode transitions via the cloud service.

FIG. 8 illustrates an example process 800 for requesting extended park mode transitions via the cloud service 208. The process 800 may be performed, for example, by the cloud service 208 in communication with the mobile device 204 and the vehicle 100 implementing extended park mode.

At operation 802, the cloud service 208 receives an extended park mode message 210 from the mobile device 204. In an example, the cloud service 208 may receive the extended park mode message 210 from the mobile device 204 responsive to user input to the user interfaces 206-C and 206-D presented to the user via the mobile device 204. In another example, the cloud service 208 may receive the extended park mode message 210 from the mobile device 204 through a user interface 206 from which the extended park mode may be disengaged. The extended park mode message 210 may include information indicating whether or not the user wishes to place the vehicle in extended park mode. In some cases, the extended park mode message 210 may include additional identifying information, such as an identifier of the mobile device 204 making the request, an identifier of an account of a user of the mobile device 204 making the request (e.g., phone number, e-mail address, etc.), and/or an identifier of the vehicle 100 whose extended park mode setting is to be updated (e.g., vehicle identification number (VIN) or some other unique vehicle 100 identifier).

At operation 804, the cloud service 208 identifies the vehicle 100 corresponding to the mobile device 204. As an example, the cloud service 208 may identify the vehicle 100 based on identifying information regarding the vehicle 100 included in the extended park mode message 210. As another example, the cloud service 208 may identify the vehicle 100 based on an existing login session of the mobile device 204 with the cloud service 208.

At operation 806, the cloud service 208 sends a request to the vehicle 100 to request the vehicle 100 to transition the extended park mode status of the vehicle 100. The request to the vehicle 100 may accordingly be configured to cause the vehicle 100 to transition to the extended park mode setting selected by the user via the user interface of the mobile device 204.

At operation 808, the cloud service 208 receives a park mode status update message 212 from the vehicle 100. The park mode status update messages 212 may include information such as the current extended park mode status of the vehicle 100. These park mode status update messages 212 may accordingly allow the cloud service 208 to track which vehicles 100 are in extended park mode, and which vehicles 100 are not. This information may be maintained, for example, to allow the cloud service 208 to only send messages to the vehicle 100 that are appropriate for vehicles 100 that are in extended park mode (e.g., only a limited set of messages such as door unlock, exit extended park mode, but not download or install a software update). As an example, based on the current state information, at operation 806 the cloud service 208 may only send the requests to the vehicle 100 to change the extended park mode setting when the cloud service 208 determines that the user has selected a change to the current extended park mode setting for the vehicle 100. After operation 808, the process 800 ends.

Figure 9:
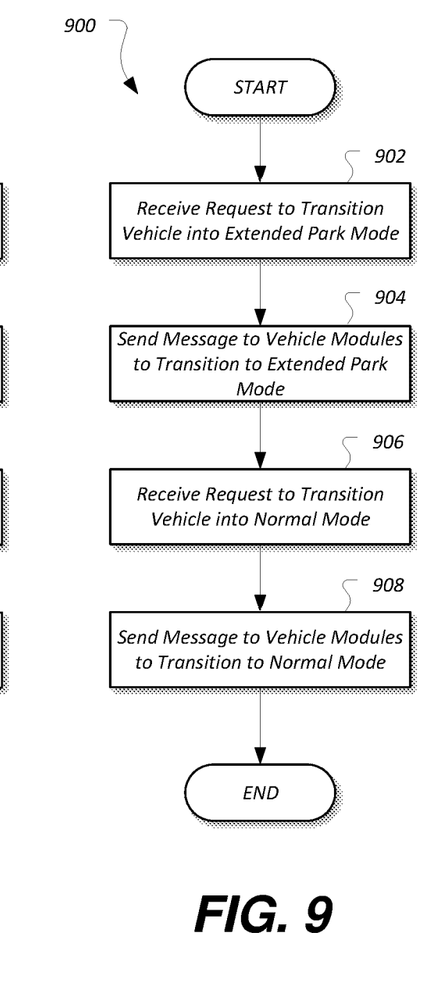
FIG. 9 illustrates an example process for requesting extended park mode transitions by the vehicle.

FIG. 9 illustrates an example process 900 for requesting extended park mode transitions by the vehicle 100. The process 900 may be performed, for example, by the extended park mode application 124 of the body control module 110 of the vehicle 100.

At operation 902, the body control module 110 receives a request to transition the vehicle 100 into extended park mode. In an example, the body control module 110 may receive the request responsive to receipt of a message by the telematics control unit 112-D sent from the cloud service 208 (e.g., as discussed above with respect to the process 800). In another example, the body control module 110 may receive the request responsive to input to the vehicle 100, e.g., via the user interface 206-A and 206-B discussed above.

At operation 904, the body control module 110 sends a message to the modules 112 configured to cause the modules 112 to transition into the extended park mode. In an example, the body control module 110 may broadcast a message across the vehicle bus 108 to the modules 112, where the message is configured to cause the modules 112 to be notified of the transition into the extended park mode. Responsive to receipt of the message, the modules 112 may be configured to perform operations to reduce their respective key-off loads on the vehicle 100.

At operation 906, the body control module 110 receives a request to transition the vehicle 100 out of extended park mode. In an example, the body control module 110 may receive the request responsive to receipt of a message by the telematics control unit 112-D sent from the cloud service 208 (e.g., as discussed above with respect to the process 800). In another example, the body control module 110 may receive the request responsive to input to the vehicle 100, e.g., via the user interface 206-F discussed above upon a key-on when the vehicle 100 is in the extended park mode.

At operation 908, the body control module 110 sends a message to the modules 112 configured to cause the modules 112 to transition out of the extended park mode. In an example, the body control module 110 may broadcast a message across the vehicle bus 108 to the modules 112, where the message is configured to cause the modules 112 to be notified of the transition out of the extended park mode back to the normal mode. Responsive to receipt of the message, the modules 112 may be configured to perform operations to return to normal functioning. After operation 908, the process 900 ends.

Figure 10:
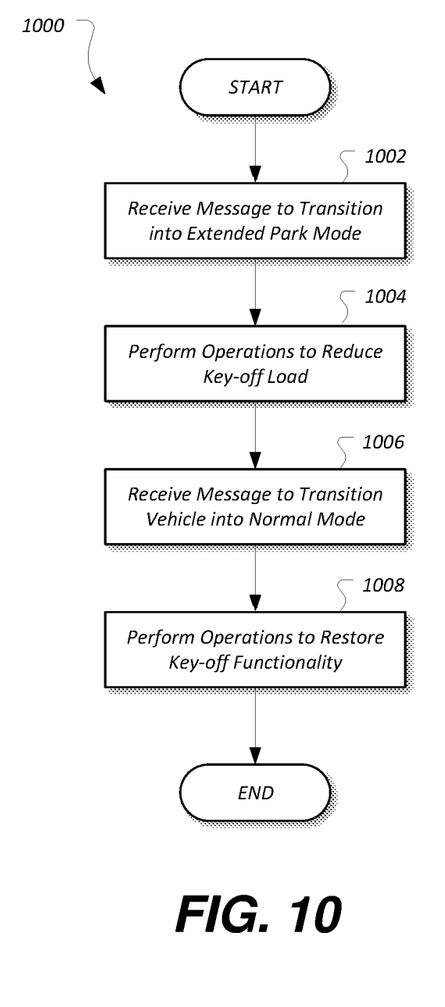
FIG. 10 illustrates an example process for performing extended park mode transitions by the modules of the vehicle.

FIG. 10 illustrates an example process 1000 for performing extended park mode transitions by the modules 112 of the vehicle 100. The process 1000 may be performed, for example, by the modules 110, 112 of the vehicle 100 to perform the operations to transition the vehicle 100 into and out of extended park mode.

At operation 1002, the module 112 receives a message to transition into extended park mode. In an example, the module 112 may receive the message responsive to operation 904 of the process 900, in which the body control module 110 sends a message to the modules 112 configured to cause the modules 112 to transition into the extended park mode.

At operation 1004, the module 112 performs operations to reduce its respective key-off load on the vehicle 100. These operations may include, for example, to slow or stop performance one or more module 112 functions, examples of which are described in detail above. As the module 112 may perform its own state adjustments, the module 112 may be accordingly able to turn off functionality appropriate for the module 112 while remaining in compliance with regulatory requirements.

These operations may also include the silencing of certain vehicle 100 alerts that may be provided to the vehicle 100 owner during normal operation. For example, for a plug-in hybrid, the vehicle 100 may turn off the sending of scheduled-charge-not-occurring messages that may be sent to a user when the vehicle 100 is scheduled to be charged but is not. As another example, the plug-in hybrid may discontinue cabin preconditioning that may be performed for a scheduled go-time for the vehicle 100, as the vehicle 100 being in extended park mode may override previously scheduled trip departure times.

At operation 1006, the module 112 receives a message to transition out of the extended park mode. In an example, the module 112 may receive the message responsive to operation 908 of the process 900, in which the body control module 110 sends a message to the modules 112 configured to cause the modules 112 to transition from the extended park mode into the normal mode.

At operation 1008, the module 112 performs operations to return to normal functioning. These operations may include, for example, to resume normal speed or otherwise resume performance one or more module 112 functions, examples of which are described in detail above. After operation 1008, the process 1000 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a cloud service configured to
      receive, over a wide-area network responsive to user input to a mobile device, an indication to transition a vehicle associated with the mobile device from a normal mode, in which a plurality of vehicle control modules of the vehicle are enabled to perform operations during key-off that incur key-off load on the vehicle, into an extended park mode, in which the plurality of vehicle control modules reduce their key-off loads on the vehicle compared to the normal mode by refraining from performing the operations, and
      responsive to the indication, provide a message over the network to the vehicle configured to instruct operations to reduce the key-off loads of the plurality of vehicle control modules by transitioning from the normal mode to the extended park mode.

2. The system of claim 1, wherein the cloud service is further configured to determine which vehicle is associated with the mobile device according to a login session of the mobile device with the cloud service.

3. The system of claim 1, wherein the cloud service is further configured to determine which vehicle is associated with the mobile device according to a vehicle identifier number (VIN) provided by the mobile device to the cloud service.

4. The system of claim 1, wherein the cloud service is further configured to maintain state information indicative of whether the vehicle is in the extended park mode.

5. The system of claim 4, wherein the cloud service is further configured to:
receive, over a wide-area network responsive to user input to a vehicle user interface, an indication to transition the vehicle associated with the mobile device out of the extended park mode, and
update the state information indicative of whether the vehicle is in the extended park mode to indicate that the vehicle is no longer in the extended park mode, responsive to the indication to transition the vehicle out of the extended park mode.

6. The system of claim 4, wherein the cloud service is further configured to filter messages provided to the vehicle from the cloud service based on the state information indicative of whether the vehicle is in the extended park mode.

7. A method comprising:
receiving, by a cloud service over a wide-area network responsive to user input to a mobile device, an indication to transition a vehicle associated with the mobile device from a normal mode, in which a plurality of vehicle control modules of the vehicle are enabled to perform operations during key-off that incur key-off load on the vehicle, into an extended park mode, in which the plurality of vehicle control modules reduce their key-off loads on the vehicle compared to the normal mode by refraining from performing the operations; and
responsive to the indication, providing a message by the cloud service over the network to the vehicle configured to instruct operations to reduce the key-off loads of the plurality of vehicle control modules by transitioning from the normal mode to the extended park mode.

8. The method of claim 7, further comprising determining which vehicle is associated with the mobile device according to a login session of the mobile device with the cloud service.

9. The method of claim 7, further comprising determining which vehicle is associated with the mobile device according to a vehicle identifier number (VIN) provided by the mobile device to the cloud service.

10. The method of claim 7, further comprising maintaining state information indicative of whether the vehicle is in the extended park mode.

11. The method of claim 10, further comprising:
receiving, over a wide-area network responsive to user input to a vehicle user interface, an indication to transition the vehicle associated with the mobile device out of the extended park mode; and
updating the state information indicative of whether the vehicle is in the extended park mode to indicate that the vehicle is no longer in the extended park mode, responsive to the indication to transition the vehicle out of the extended park mode.

12. The method of claim 10, further comprising filtering messages provided to the vehicle from the cloud service based on the state information indicative of whether the vehicle is in the extended park mode.

13. A non-transitory computer readable medium comprising instructions that, when executed by a processor of a cloud service, cause the cloud service to:
receive, over a wide-area network responsive to user input to a mobile device, an indication to transition a vehicle associated with the mobile device from a normal mode, in which a plurality of vehicle control modules of the vehicle are enabled to perform operations during key-off that incur key-off load on the vehicle, into an extended park mode, in which the plurality of vehicle control modules reduce their key-off loads on the vehicle compared to the normal mode by refraining from performing the operations, and
responsive to the indication, provide a message over the network to the vehicle configured to instruct operations to reduce the key-off loads of the plurality of vehicle control modules by transitioning from the normal mode to the extended park mode.

14. The medium of claim 13, further comprising instructions that, when executed by the processor of the cloud service, cause the cloud service to determine which vehicle is associated with the mobile device according to a login session of the mobile device with the cloud service.

15. The medium of claim 13, further comprising instructions that, when executed by the processor of the cloud service, cause the cloud service to determine which vehicle is associated with the mobile device according to a vehicle identifier number (VIN) provided by the mobile device to the cloud service.

16. The medium of claim 13, further comprising instructions that, when executed by the processor of the cloud service, cause the cloud service to maintain state information indicative of whether the vehicle is in the extended park mode.

17. The medium of claim 16, further comprising instructions that, when executed by the processor of the cloud service, cause the cloud service to:
receive, over a wide-area network responsive to user input to a vehicle user interface, an indication to transition the vehicle associated with the mobile device out of the extended park mode, and
update the state information indicative of whether the vehicle is in the extended park mode to indicate that the vehicle is no longer in the extended park mode, responsive to the indication to transition the vehicle out of the extended park mode.

18. The medium of claim 16, further comprising instructions that, when executed by the processor of the cloud service, cause the cloud service to filter messages provided to the vehicle from the cloud service based on the state information indicative of whether the vehicle is in the extended park mode.

* * * * *